United States Statutory Invention Registration [19]

[11] Reg. Number: H758

Chin [43] Published: Apr. 3, 1990

[54] SEALANT COMPOSITION

[76] Inventor: Steven S. Chin, 6301 Sierra Blanca #4009, Houston, Tex. 77083

[21] Appl. No.: 137,036

[22] Filed: Dec. 23, 1987

[51] Int. Cl.[4] ..... C08L 47/00

[52] U.S. Cl. ..... 525/75; 525/86; 525/98; 524/504; 524/505

[58] Field of Search ..... 525/74, 78; 524/272

[56] References Cited

U.S. PATENT DOCUMENTS

| | | | |
|---|---|---|---|
| 3,239,478 | 3/1966 | Harlan, Jr. | 260/27 |
| 4,007,311 | 2/1977 | Harlan, Jr. | 428/246 |
| 4,418,123 | 11/1983 | Bunnelle et al. | 528/98 |
| 4,578,429 | 3/1986 | Gergen et al. | 525/291 |

FOREIGN PATENT DOCUMENTS

| | | | |
|---|---|---|---|
| 0019337 | 2/1983 | Japan | 525/74 |
| 0019376 | 2/1983 | Japan | 525/74 |

*Primary Examiner*—John F. Terapane
*Assistant Examiner*—John M. Covert

[57] ABSTRACT

A sealant composition comprises a functionalized polymer component which is prepared by grafting enough carboxylic acid, dicarboxylic acid, or derivative thereof onto a polymer component to thereby functionalize the polymer component and provide a resultant sealant composition with adhesive which is resistant to deterioration in the presence of water, said polymer component comprising a multiblock copolymer having at least two end blocks A and at least one midblock B, wherein the A blocks comprise monoalkenyl arene blocks and the B blocks comprise substantially completely hydrogenated conjugated diene polymer blocks.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SEALANT COMPOSITION

BACKGROUND OF THE INVENTION

Numerous sealant compositions are known in the literature. One of the basic patents in this field is Harlan, U.S. Pat. No. 3,239,478, which shows combinations of styrene-diene block copolymers with tackifying resins and the like to produce a wide variety of sealants and adhesives. Further, it is known that butyl rubbers can be used in a variety of adhesives, sealants and coatings. It has been known that these butyl rubber compounds do not adhere well to polar substrate since the butyl rubber does not form strong chemical bonds to polar substrates.

U.S. Pat. No. 4,007,311, also issued to Harlan, recognized this phenomenon and provides a sealant composition which improves the adhesive qualities of the base block copolymer to polar substrates. This composition covers a base formulation which comprises 5 to 50 weight percent of a block copolymer, to which had been grafted a polymer of an acrylic ester, and from 95-50 weight percent of a non-modified polymer, e.g. polyurethanes, block copolymers, etc. The base copolymer was applied to the substrates in a solvent solution.

U.S. Pat. No. 4,578,429, issued to Gergen et al, describes hydrogenated block copolymers to which are grafted unsaturated, carboxylic acid containing monomers that are non polymerizable or slowly polymerizable. These modified block copolymers were expected to improve the adhesion of the block copolymers to substrates when used in adhesives, sealants, and coatings, although no examples were given of such uses.

SUMMARY OF THE INVENTION

The invention involves a sealant composition comprising:

(a) 100 parts by weight of a functionalized polymer component which is prepared by grafting enough carboxylic acid or dicarboxylic acid containing monomer or derivatives thereof onto a polymer component to thereby functionalize the polymer component and provide a resultant sealant composition with adhesion which is resistant to deterioration in the presence of water;

said polymer component comprising a multiblock copolymer having at least two end blocks A and at least one midblock B, wherein:

the A blocks comprise monoalkenyl arene blocks and the B blocks comprise substantially completely hydrogenated conjugated diene polymer blocks, and the average molecular weight of the A blocks is greater than the minimum molecular weight needed to obtain microphase separation and domain formation of the A blocks, and is less than the maximum molecular weight which would render the polymer incapable of being melt processed, the multiblock copolymer comprises a monoalkenyl arene content which is no more than the maximum weight percent needed to retain a modulus suitable as a sealant in the resultant composition and no less than the minimum weight percent needed to obtain the desired phase separation and the desired cohesive strength; and (b) an amount of a midblock compatible component wherein said midblock compatible component is at a concentration to maintain the resultant composition in a pliable condition at room temperature and to maintain the glass transition temperature of the resultant composition below 10° C.

The midblock compatible component can be either a midblock compatible resin or a midblock compatible plasticizer or mixtures thereof. When a midblock compatible component is included in the formulation, up to about 400 parts by weight of the midblock compatible component is used. When mixtures of midblock compatible components are used, the total may be included in the formulation at up 800 parts by weight.

The carboxylic acid containing polymer component preferably comprises a multiblock copolymer having at least two endblocks A and at least one midblock B as described, wherein the average molecular weights of the A blocks are between about 3000 and about 40,000 and the multiblock copolymer has a monoalkenyl arene content of between about 7% and about 45% by weight. The most preferred weight percent of the monoalkenyl arene of the multiblock copolymer is between 10% and 30% wt.

The sealant may also contain an endblock compatible component at a concentration which is less than the solubility limit of the component in the polymer with utility to maintain the cohesive qualities of the resultant composition at elevated temperatures.

Additional components may be present in the sealant, including up to about 900 parts by weight of a filler, an antioxidant, and an ultraviolet stabilizer.

DETAILED DESCRIPTION OF THE INVENTION

The term "functionalized polymer component" refers to the combination of a multiblock copolymer reacted with a carboxylic or dicarboxylic acid monomer or derivative thereof as described in U.S. Pat. No. 4,578,429, owned by Shell Oil Co., which is incorporated by reference herein. The '429 patent teaches the preparation of the desired polymer component such as by reacting a hydrogenated styrene-butadienestyrene (S-EB-S) block copolymer with a dicarboxylic acid or carboxylic acid monomer such as maleic acid or formic acid or derivatives thereof such as maleic anhydride in the presence of an organic peroxide that is capable of generating free radicals in the hydrogenated styrene-butadiene-styrene copolymer. This component can be produced using the usual equipment for processing S-EB-S copolymers under normal processing conditions. For the present invention, the copolymer preferably has a weight percent of about 10% to about 30% styrene.

The amount of the acid monomer used should be between about 0.5% to about 5% by weight of the polymer component to obtain noticeable improvement in adhesion of the sealant composition without severely degrading the block copolymer. An amount of 1% to 3% by weight is preferred to provide good adhesion.

The functionalized polymer component is prepared using a free radical generator which consists of an organic peroxide which can generate free radicals in a typical hydrogenated styrene-butadienestyrene copolymer at a reaction temperature resulting in a half-life of 6 minutes and preferably less than 1 minute at the reaction temperature. Typical examples of organo peroxides are dialkyl peroxides such as dicumyl peroxide and 1,3-bis(-tert-butylperoxyisopropyl)benzene. Other peroxides such as diacyl peroxides, alkyl peresters and percarbonates may be suitable for initiating graft sites on the polymer.

The amount of free radical generator to be added to facilitate the functionalization of the polymer component depends on the properties (copolymer composition and melt index) of the hydrogenated styrene-butadiene-styrene copolymer used and the desired degree of cross-linking as well as on the type of free radical generator. From about 0.01 wt % to about 3 wt % of free radical generator is added. Preferably from about 0.05 wt % to about 1.5% of free radical generator is used.

In the first step of preparing the novel sealant composition of the present invention, the reaction between the hydrogenated styrene-butadiene-styrene copolymer and carboxylic acid containing monomer or its derivative is executed in the temperature range between 140° C. up to the decomposition temperature of the hydrogenated styrenebutadiene-styrene copolymer. This reaction can be carried out in any appropriate device as long as an adequate dispersion of the added material and an adequate temperature of the kneaded material are achieved. For example, single or double screw extruders, the Ko-Kneader, the Banbury mixer or roll mills, may be used within the scope of the invention.

The functionalized block copolymer component by itself lacks the required adhesion needed for a sealant composition. Therefore, it is necessary to add an adhesion promoting or tackifying resin that is compatible with the elastomeric hydrogenated conjugated diene block. A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% Z-methyl-2-butene and about 10% dimer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins, and polymerized mixed olefins. To obtain good ultraviolet resistance, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such a Regalrez® resin made by Hercules.

The amount of adhesion promoting resin employed varies from about 20 to about 400 parts by weight per hundred parts rubber (phr), preferably between about 100 to about 350 phr.

The sealant composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo@6056 made by Arco. The amount of rubber compounding oil employed in the inventive composition can vary from 0 to about 100 phr, and preferably between about 0 to about 60 phr.

Optionally, an endblock-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of endblock compatible resins having high and low softening points may also be used. Useful resins include coumaroneindene resins, polystyrene resins, vinyl toluene-alphamethylstyrene copolymers, and polyindene resins. An alphamethylstyrene resin is most preferred. The amount of endblock-compatible resin can vary from 0 to about 200 phr.

The compositions of this invention may be modified with supplementary materials including oxidation/UV stabilizers, pigments and fillers, such as calcium carbonate, talc, clay, aluminum trihydrate (an accelerator) or zinc oxide (a retarder).

For some applications it may be desirable to apply the sealant as a hot melt. In those situations, no additional solvents or carriers are required.

In other situations, it may be desirable to employ the novel sealant at ambient temperatures. In those situations additional solvents or carriers are added. Suitable carrier materials include organic solvents such as hexanes, naphthas, mineral spirits, and toluene, ester solvents such as ethyl acetate and propyl acetate, and ketone solvents such as methyl ethyl ketone and methyl isobutyl ketone. The amount of solvent added can vary from 0 to about 400 phr, and preferably from 0 to about 200 phr.

The sealants used in the following illustrative embodiments generally have the combination of properties which are normally found in relatively soft, elastomeric sealants. All of the sealants in the illustrative embodiment examples are expected to have a Shore A hardness in the 10 to 50 range, preferably about 25. The critical test which distinguishes sealants made with conventional technology from the novel sealants of this invention is the 180° peel test of the sealant on glass, cold rolled steel, and anodized aluminum. This test is run according to the testing procedure given in Federal Specification TT-S-00230C. Test samples made with the solvent based sealants were prepared according to the procedure given in TT-S-00230C, applying the sealant and curing it for 21 days prior to testing. Test samples made with the hot melt sealants were prepared according to the procedure given in TT-S-00230C except that the sealants were applied with a standard hot melt applicator. After the sealants cool, they are conditioned 24 hours at standard conditions before testing.

The invention is further illustrated by means of the following illustrative embodiments, which are given for the purpose of illustration only and are not meant to limit the invention to the particular components and amounts disclosed.

Illustrative Embodiment 1

(Comparison)

The polymers used to illustrate the invention are shown in Table 1. Polymer 1 is an unfunctionalized KRATON®G1652 A-B-A type block polymer (available from Shell Chemical Co.) where A is polystyrene and B is hydrogenated polybutadiene containing about 30%wt. of the polystyrene. Polymer 1 was included to illustrate the performance which can be achieved with conventional, prior art technology. The polymers used to illustrate the present invention are polymers 2 and 3 in Table 1.

Illustrative Embodiments 2 and 3

Polymers 2 and 3 have been functionalized by extruding the KRATON®G 1652 block polymer with a monomer and peroxide using a 30 mm corotating twin screw extruder. The temperature profile in the extruder during grafting varied from about 150° C. at the feed port to about 250° C. at the exit.

Results in Table 1 show the effectiveness of two different monomers grafted onto the KRATON® G block polymer. Formulation 2 in Table 1 is based on KRATON®G1652 block copolymer grafted with 1.2 wt.% maleic anhydride, an anhydride derivative of maleic acid. Formulation 3 is based on KRATON® G 1652 block copolymer grafted with 1.6 wt. % acrylic acid. Results show that carboxylic acid monomers and anhydride derivatives are effective in improving the adhesion of the sealant composition to the glass, steel, and aluminum substrates. Further, the functionalized block copolymers sufficiently improved the adhesion of the composition to aluminum to give cohesive failure of the composition rather than adhesive failure.

TABLE 1

Specific Adhesion Improvement with Functionalized KRATON ® G Block Copolymer In Hot Melt Sealants

| INGREDIENTS | 1 | 2 | 3 |
|---|---|---|---|
| | | PHR | |
| KRATON G1652 Copolymer | 100 | | |
| KRATON G1652/MA Copolymer[a] | | 100 | |
| KRATON G1652/AA Copolymer[b] | | | 100 |
| REGALREZ 1018 Resin | 270 | 270 | 270 |
| ENDEX 160 Resin | 50 | 50 | 50 |
| IRGANOX 1010 Antioxidant | 1 | 1 | 1 |
| TINUVIN 770 U.V. Stabilizer | 1 | 1 | 1 |
| TINUVIN P U.V. Stabilizer | 1.5 | 1.5 | 1.5 |
| Melt Viscosity at 177° C., cps | 3205 | 3315 | 2180 |
| TENSILE PROPERTIES | | | |
| Tensile Strength at break | 343 psi | 346 psi | 211 psi |
| Modulus at 100% elongation | 46 psi | 66 psi | 33 psi |
| Elongation at break | 750% | 800% | 750% |
| ADHESION RESULTS[c] | | | |
| 180° PEEL T0 GLASS, PLI | 35 A | 77 A | 52 AC |
| 180° PEEL T0 STEEL, PLI | 27 A | 70 A | 39 AC |
| 180° PEEL T0 ALUMINUM, PLI | 16 A | 79 C | 53 C |
| 180° PEEL TO ANODIZED ALUMINUM, PLI | 23 A | 115 C | 72 C |

[a]1.2 wt. % Maleic Anhydride grafted.
[b]1.6 wt. % Acrylic Acid grafted.
[c]Substrates preheated to 130° C. for 10 minutes, peel adhesion assembly post heated at 130° C. for 10 minutes.
AC: adhesive failure to canvas backing.
C: cohesive sealant failure.
A: adhesive failure to substrate.

What is claimed:

1. A sealant composition comprising:

(a) 100 parts by weight of a functionalized polymer component which is prepared by grafting carboxylic acid, dicarboxylic acid, or a derivative thereof onto a polymer component in an amount from about 0.5% to about 5.0% by weight of the polymer component to thereby functionalize the polymer component and provide a resultant sealant composition with adhesion improved to polar substrates;

said polymer component comprising a multiblock copolymer having at least two endblocks A and at least one midblock B, wherein:

the A blocks comprise monoalkenyl arene blocks and the B blocks comprise substantially completely hydrogenated conjugated diene polymer blocks, and the average molecular weight of the A blocks is greater than the minimum molecule weight needed to obtain microphase separation and domain formation of the A blocks, and is less than the maximum molecular weight which would render the polymer incapable of being melt processed;

the multiblock copolymer comprises a monoalkenyl arene content which is no more than the maximum weight percent needed to retain a modulus suitable as a sealant in the resultant composition and no less than the minimum weight percent needed to obtain the desired phase separation and the desired minimum cohesive strength; and (b) an amount of a midblock compatible component wherein said midblock compatible component is at a concentration to maintain the resultant composition in a pliable condition at room temperature, to maintain the glass transition temperature of the resultant composition below 10° C., and to provide sufficient peel strength to allow cohesive failure of the sealant composition when applied to aluminum or anodized aluminum.

2. The composition according to claim 1, wherein said functionalized polymer component comprises a multiblock copolymer having at least two endblocks A and at least one midblock B as described, with an average molecular weight of the A blocks between about 3000 and about 40,000 and said multiblock copolymer has a monoalkenyl arene content of between about 7% and about 45% by weight.

3. The composition according to claim 2, wherein the weight percent of the monoalkenyl arene of the multiblock copolymer is between 10% and 30%wt.

4. The composition according to claim 2, wherein said monoalkenyl arene portion of the functionalized polymer component is styrene and said conjugated diene portion of the functionalized polymer component is hydrogenated butadiene.

5. The composition according to claim 1, wherein said multiblock copolymer of the functionalized polymer component is a selectively hydrogenated linear polystyrene-polybutadiene-polystyrene block copolymer.

6. The composition according to claim 5, wherein the functionalized polymer component is produced by grafting maleic acid or maleic anhydride to the polymer in an amount between about 1.0% and about 3.0% by total weight of the polymer component.

7. The composition according to claim 5, wherein the functionalized polymer component is produced by grafting acrylic acid to the polymer in an amount between about 1.0% and about 3.0% by total weight of the polymer component.

8. The composition according to claim 1, wherein said multiblock copolymer of the functionalized polymer component is a selectively hydrogenated polystyrene-polyisoprene-polystyrene block copolymer.

9. The composition according to claim 4, wherein said hydrogenated butadiene component of the functionalized polymer component has a 1,2 configuration of between about 35 and 65 mol percent.

10. The composition according to claim 1, wherein said midblock compatible component is a member of the group consisting of a midblock compatible resin, a midblock compatible plasticizer and mixtures thereof.

11. The composition according to claim 1, wherein said midblock compatible component is present from about 270 to about 400 parts by weight per hundred parts of the functionalized polymer component.

12. The composition of claim 1, further comprising an amount of endblock compatible component wherein said component is at a concentration which is less than the solubility limit of the component in the polymer with utility to maintain the cohesive qualities of the resultant composition at elevated temperatures.

13. The composition of claim 12, wherein said endblock compatible component is an endblock compatible resin.

14. The composition of claim 13, wherein said endblock compatible resin is amorphous polyalphamethyl styrene.

15. The composition of claim 11 wherein the midblock compatible component is a saturated resin selected from a group consisting of hydrogenated dicylopentadiene, hydrogenated polystyrene, and hydrogenated polyalphamethylstyrene.

16. The composition of claim 15 wherein the midblock compatible component is hydrogenated polyalphamethylstyrene.

* * * * *